United States Patent
Perez et al.

(10) Patent No.: US 12,304,736 B2
(45) Date of Patent: May 20, 2025

(54) THREE-DIMENSIONAL, MODULAR SYSTEM FOR MOVING STANDARD ELEMENTS WITHIN A THREE-DIMENSIONAL STRUCTURE OF THE GRID TYPE

(71) Applicant: GALAM ROBOTICS, Paris (FR)

(72) Inventors: Samuel Perez, Paris (FR); Jonathan Levy, Paris (FR)

(73) Assignee: GALAM ROBOTICS, Paris (FR)

( * ) Notice: Subject to any disclaimer, the term of this patent is extended or adjusted under 35 U.S.C. 154(b) by 761 days.

(21) Appl. No.: 17/622,108

(22) PCT Filed: Jun. 26, 2020

(86) PCT No.: PCT/EP2020/068108
§ 371 (c)(1),
(2) Date: Dec. 22, 2021

(87) PCT Pub. No.: WO2020/260639
PCT Pub. Date: Dec. 30, 2020

(65) Prior Publication Data
US 2022/0242668 A1    Aug. 4, 2022

(30) Foreign Application Priority Data
Jun. 27, 2019 (FR) ...................................... 1907047

(51) Int. Cl.
*B65G 1/137* (2006.01)
(52) U.S. Cl.
CPC ................................. *B65G 1/1373* (2013.01)
(58) Field of Classification Search
CPC ...... B65G 1/1373; B65G 1/12; B65G 1/0478; B65G 1/10
See application file for complete search history.

(56) References Cited

U.S. PATENT DOCUMENTS 2,712,875 A   7/1955  Leopold
2,837,224 A   6/1958  Rosen
(Continued)

FOREIGN PATENT DOCUMENTS

JP   2013052979 A   3/2013
JP   2016-160040 A  9/2016

OTHER PUBLICATIONS

International Application No. PCT/EP2020/068108, International Search Report and Written Opinion, mailed Oct. 7, 2020.
(Continued)

*Primary Examiner* — Jacob S. Scott
*Assistant Examiner* — Erin Morris
(74) *Attorney, Agent, or Firm* — MARSHALL, GERSTEIN & BORUN LLP

(57) ABSTRACT

The invention relates to a modular system (1) for moving storage elements, including a plurality of adjacent modules (200) and at least one bin (300) that can be moved in the modular structure from one module to an adjacent module, with a module including a frame (210) of rectangular parallelepiped shape including bars (212, 213, 214, 215) that are assembled together, at least either the modules or the bins including at least one actuator (400) and the other, modules or bins, comprising including complementary cavities (700), either the actuators or the cavities being fixed to the bars of the frame, the other being fixed to the bin, the actuators and the cavities being configured to cooperate so as to move a bin located at least partially inside one module in translation to an adjacent module.

13 Claims, 16 Drawing Sheets

(56) References Cited

U.S. PATENT DOCUMENTS

| | | | | |
|---|---|---|---|---|
| 9,796,527 B1* | 10/2017 | Kaukl | ................. | B65G 1/0492 |
| 2008/0211358 A1* | 9/2008 | Borgwarth | ........... | B65G 1/0478 |
| | | | | 312/35 |
| 2019/0062058 A1* | 2/2019 | Goetz | ..................... | B65G 1/04 |

OTHER PUBLICATIONS

French Patent Application No. 1907047, Preliminary Search Report, dated Apr. 9, 2020.

\* cited by examiner 600
500
501

THREE-DIMENSIONAL, MODULAR SYSTEM FOR MOVING STANDARD ELEMENTS WITHIN A THREE-DIMENSIONAL STRUCTURE OF THE GRID TYPE

CROSS-REFERENCE TO RELATED APPLICATIONS

This application is a U.S. National stage of International Patent Application No. PCT/EP2020/068108 filed Jun. 26, 2020, which claims the benefit of priority of French Patent Application No. 1907047 filed Jun. 27, 2019, the respective disclosures of which are each incorporated herein by reference in their entireties.

FIELD OF THE INVENTION

This invention relates to the field of automated storage solutions.

With the sharp rise in industrial demand, granular logistics and e-Business, the development and use of automated stock storage and retrieval solutions are proving a determining factor for many stakeholders.

PRIOR ART

Different types of solution have been proposed depending on the type of requirements they address.

Technologies of "stacking crane" type denote a machine moving in two dimensions between two shelves of products. A stacking crane is composed of a mobile platform (currently known as an 'arm') which moves along opposite the desired product, retrieves it, and brings it to an external operator or a retrieval area. A stacking crane is an essentially two-dimensional machine and can potentially operate at great height.

Technologies of "Carousel" type denote a rotating elevator and a system of containers all linked to a translation system of belt type. The belt moves the containers. The principle is to bring the container having the desired product to an exit point. This type of technology can be vertically or horizontally oriented. The most often-used technology of Carousel type is known as a "vertical rotary storage system".

Technologies of "Robot fleet" type employ a fleet of mobile robots that can retrieve standard containers. Certain solutions employ autonomous and mobile robots moving over the floor in two dimensions in such a way as to transport shelves in which products are found.

Other solutions employ autonomous and mobile robots moving in two dimensions above a stock grid, and which retrieve by systems for setting down/picking up products located under them.

Automatic distributors, conventionally used by the public, particularly as drinks or food distributors, can manage products of low weight and volume.

These technologies differ in nature but also in performance and are therefore not suitable for the same uses.

Stacking cranes have low compactness due to the empty spaces necessary for the displacement of the platform between the shelves of products. In addition, the stock flow rate of such a system depends on the position of the desired product with respect to the retrieval area and the incompressible displacement times of the platform. Only one product can be retrieved per platform displacement. Furthermore, such systems are difficult to implement in certain storage space configurations.

Carousel technologies have high compactness at the expense of the flow of stock that can be distributed in parallel. In particular, demand peaks invariably cause queues due to the low stock distribution rate. In addition, the dimensions of the carousels are standardized and occupy a predefined volume which means it cannot be adapted to all spaces.

Mobile robot fleets allow adaptability to the required stock flow rate and are adaptable to many space constraints as long as the space needed for their circulation is large. Storage systems using such technology will therefore exhibit limited compactness due to the space needed for the circulation of the robots.

Automatic distributors are very compact and hence offer good adaptability to restricted storage spaces, at the expense of the stock distribution rate which is limited and therefore causes queues in the event of demand peaks.

Non-automated storage methods are conventionally encountered in environments placing heavy constraints on bulk and necessitating compactness of storage. For example, dynamic archiving, in which shelves are mounted on mobile frames on rails, makes it possible to maximize the storage capacity as a function of the warehouse. However, such a technology has a very limited flow rate, since the user is obliged to displace the shelves to then retrieve each product he needs, which limits the accessibility and stock distribution flow of the system.

There is therefore a technical requirement for a compact storage solution, adaptable to all types of space, particularly restricted spaces, and having a high distribution rate while limiting the need for manual intervention and thus facilitating its use.

SUMMARY OF THE INVENTION

A general aim of the invention is to make provision for a compact storage solution, adaptable to any type of storage environment and having a high distribution rate.

Another aim is to facilitate the installation and maintenance of an automated storage system.

The invention makes provision for a modular system for the displacement of storage items including a plurality of adjacent modules and at least one cell able to be displaced through the modular structure from a module to an adjacent module, a module including a frame of rectangular parallelepipedal shape including bars assembled together, at least one from among the modules and cells including at least one actuator and the other from among the modules and cells including complementary indentations, one from among the actuators and indentations being attached to the bars of the frame, the other from among the actuators and indentations being attached to the cell, the actuators and indentations being configured to cooperate in such a way as to translate a cell located at least partly in one module toward an adjacent module, the system further including a central controller, configured to drive the actuators and manage the displacement of the cell through the system.

The invention may advantageously by completed by the following features, taken alone or in combination:

- an actuator including a driving element configured to engage with the indentations, and a clutching device configured to retract the driving element into a declutched position in which the driving element is at a distance from the indentations such that the driving element does not interact with the indentations; this alternatively makes it possible to move the cell or to release the cell in such a way as to allow its circulation between the modules; this in particular allows for the displacement of the cell in all three directions within one and the same module;

at least one of the actuators of a module is able to drive the cell in both senses of one and the same direction of translation; this makes it possible to limit the number of actuators;

the actuators of a module are able to translate the cell along 3 dimensions;

the driving element is extended in the clutched position to come into engagement with a driving surface or indentations located on the edges or chamfers of the cell;

during its retraction, the driving element is displaced in a plane inclined with respect to the faces of the module, the inclination being between 30° and 60°; this makes it possible to free up the passage of a cell in two directions;

the actuator includes a vertical actuator including a worm screw rotatably mounted on the frame, a nut cooperating with the screw, the nut including a protrusion configured to cooperate with a vertical indentation made along a vertical edge of the cell, in such a way as to vertically translate the cell when the protrusion cooperates with the vertical indentation and the screw is rotated; this makes it possible to obtain significant robustness of the system, as well as a static position that is easy to implement;

the actuator includes a horizontal actuator including at least one horizontal translator including:
  a driving element configured to cooperate with a horizontal indentation made on the cell in such a way as to translate the cell;
  a driving actuator configured to rotate the driving element;
  a clutching device configured to, selectively, engage the driving element and the cell or disengage the driving element from the cell;

the clutching device includes a movable arm rotatably mounted on a translator frame mounted fixed on the frame, the driving element being rotatably mounted at one end of the movable arm, and a clutching actuator configured to rotate the movable arm, the driving element and the driving actuator being also mounted on the movable arm; this makes it possible to improve the compactness of the actuator;

the horizontal translator further includes an input shaft rotatably mounted in the translator frame, and a distribution assembly driven by the input shaft, the distribution assembly being configured to rotate the clutching actuator and the driving actuator at once; this makes it possible to limit the number of motors of the actuator, and incidentally its bulk, weight and cost;

the clutching device includes a clutching actuator including:
  a cam rotatably mounted on the movable arm;
  a friction assembly configured to transmit a limited torque from the distribution assembly to the cam and thus ensure the rotating of the cam
  a cam roller rotatably mounted on the frame configured to cooperate with the cam;

the friction assembly includes:
  a friction washer inserted between the cam and the distribution assembly;
  a compression spring compressed between the movable arm and the cam and configured to supply a friction force in such a way as to ensure the driving by friction of the cam by the distribution assembly by way of the friction washer;

the friction assembly includes a split ring secured to the cam, the cam and split ring assembly being rotatably mounted on the support shaft, the support shaft being rotated by the fourth pulley or the second pinion, the split ring providing a friction force on the support shaft making it possible to drive the cam and split ring assembly in rotation;

the horizontal actuator includes several horizontal translators, a transmission shaft and an electrical motor configured to drive the transmission shaft, the transmission shaft being configured to simultaneously drive the horizontal translators; this makes it possible to reduce the number of motors of the actuator, and therefore its cost and its bulk;

the distribution assembly comprises:
  a first pulley mounted on a first intermediate shaft, the first intermediate shaft being rotatably mounted on the translator frame along an axis perpendicular to the input shaft axis, and being rotated by the input shaft by means of a first bevel pinion and a second bevel pinion mounted respectively on the input shaft and the first intermediate shaft;
  a second pulley rotatably mounted on a shaft mounted on the movable arm, the second pulley being configured to drive the driving element;
  a first belt cooperating with the first pulley and the second pulley;
  a third pulley rotatably mounted on the shaft, the third pulley being rotationally secured to the second pulley;
  a fourth pulley rotatably mounted on a support shaft mounted on the movable arm, the fourth pulley being configured to drive the clutching actuator;
  a second belt cooperating with the third pulley and the fourth pulley.

According to another aspect, the invention makes provision for a module for a modular system for the displacement of storage items according to the invention, including a frame formed by a plurality of bars, and actuators configured to drive a cell in motion through the module.

According to another aspect, the invention makes provision for a cell for a modular system for the displacement of storage items according to the invention, including indentations configured to cooperate with the actuators in such a way as to allow the displacement of the cell through the system.

According to another aspect, the invention makes provision for a method of displacement of a target cell between an initial module and a final module in a modular system for the displacement of storage items according to the invention, comprising the steps of:

S10: Determination of a path between the initial module and the final module, the path including N modules, S20: Displacement of the cells located on the previously determined path in such a way as to free up the path, S30: Displacement of the target cell toward the final module passing through the modules of the path.

In such a method, the step S30 is advantageously carried out each time the module of the path adjacent to the target cell is freed up.

According to another aspect, the invention makes provision for a computer program product including code data configured, when implemented by a computing unit, to implement a method of displacement of a cell according to the invention in a modular system for the displacement of storage items according to the invention.

DESCRIPTION OF THE FIGURES

The specific features of the Invention will become clearly apparent on reading a description of an embodiment of the invention, given by way of simple illustrative and non-limiting example, and of the appended drawings among which:

FIGS. 10a, 10b and 10c illustrate in detail the driving of the cam by means of a friction device;

FIGS. 10a and 10b illustrate a first embodiment of a friction device; FIG. 10c illustrates a second embodiment of a friction device;

DETAILED DESCRIPTION OF THE INVENTION

General

Figure 1:
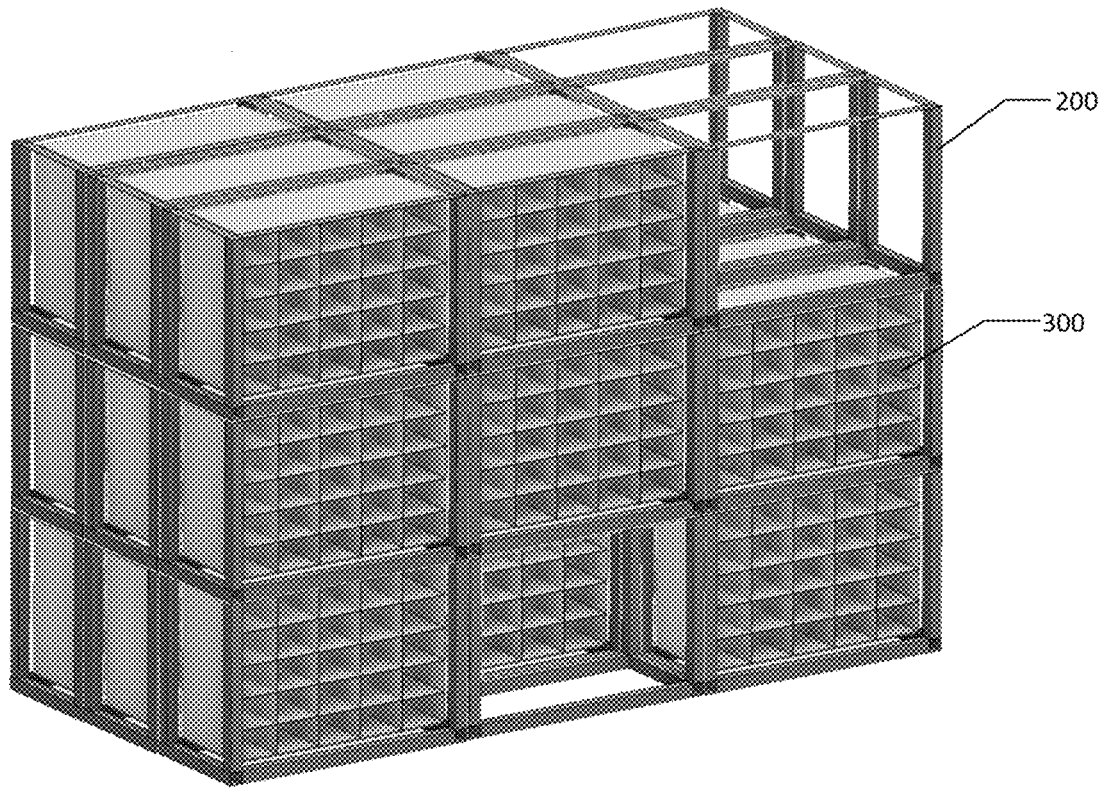
FIG. 1 is a perspective view of an embodiment of a modular system for the displacement of storage items according to the invention.

With reference to FIG. 1, a modular system 1 for the displacement of storage items includes a plurality of adjacent modules 200, and a plurality of cells 300 able to be displaced from a module 200 to an adjacent module 200.

The structure of the system 1 is modular due to the fact it includes a plurality of modules 200 which are positioned then attached together during the installation of the structure in such a way as to adapt to any bulk constraints.

This also makes it possible to facilitate any subsequent repair operation with the aim of upgrading the structure. Thus, many configurations are possible as illustrated in FIGS. 2a, 2b and 2c.

Figure 2A:
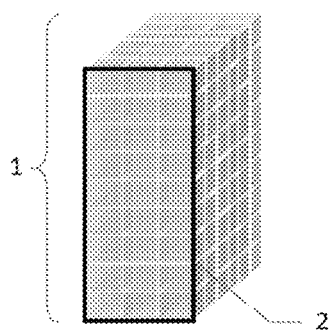
FIGS. 2a, 2b and 2c are views of examples of configuration of a modular system for the displacement of storage items according to the invention.
Figure 2B:
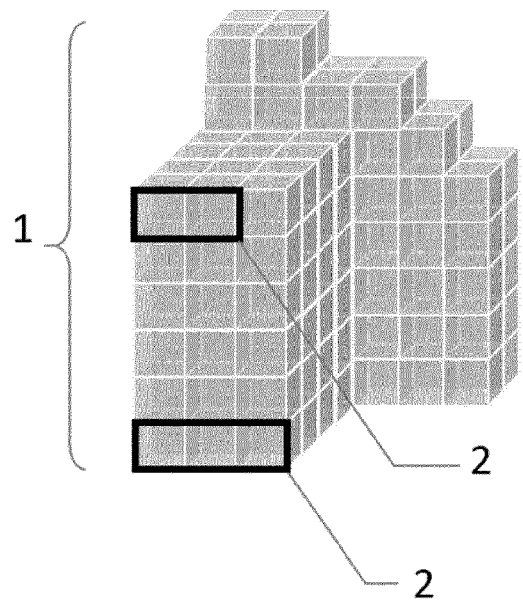
Figure 2C:
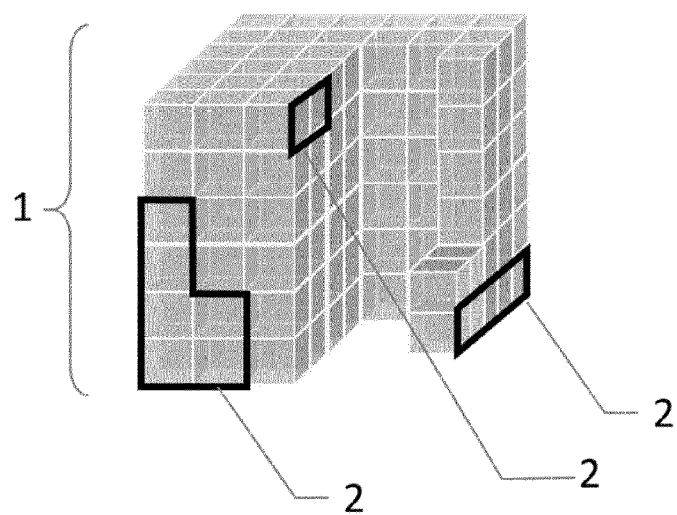

In FIG. 2a, the modules 200 form a conventional parallelepipedal structure. As a function of the installation constraints of the system 1, each module 200 having an accessible face represents an interface potentially accessible by a user.

The term "accessible face" is understood to mean a face of a module which is not facing any face of a module adjacent to said module.

Thus, in the embodiment illustrated in FIG. 2a, the system has an interface area 2. In practice, all the modules 200 of one and the same face of the system 1 may be accessible to a user.

In a second example illustrated in FIG. 2b, the system 1 has a shape adapted to bulk constraints due to the shape of the storage space. It shows in the illustrated example two interface areas 2 which may for example be located on two different floors of a building.

In a third example illustrated in FIG. 2c, the system 1 has a shape adapted to the architectural constraints of the storage space and has three interface areas 2 which may be located at different access points, for loading or unloading, in the building.

The modularity of the system 1 can thus facilitate and streamline the flows of stock between the delivery point or points and the withdrawal point or points of the stock.

It therefore suffices to juxtapose and stack the modules 200 by connecting them together to form the modular structure, which is therefore dismantlable or modifiable by an identical method.

Advantageously, the modules 200 all have an identical shape; in this embodiment, the modules are rectangular parallelepipedal. This architecture facilitates the displacements of the cells 300 through the system 1 while maximizing the storage space available in a cell 300.

The system 1 for the displacement of storage items further includes a plurality of actuators 400 configured to drive the cells 300, and a plurality of command elements 500 configured to drive the actuators 400 and manage the displacement of the cell or cells 300 present in the system 1.

Figure 3:
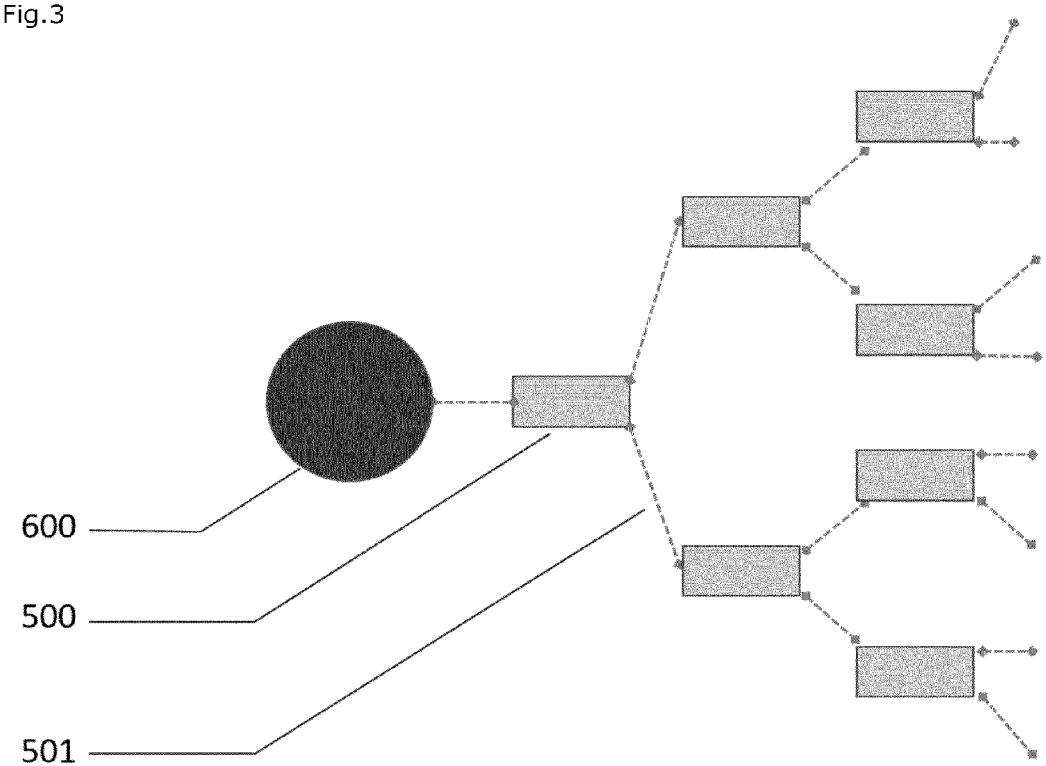
FIG. 3 is a diagram of an embodiment of an electronic and computer network of a modular system for the displacement of storage items according to the invention.

With reference to FIG. 3, a central controller 600 is configured to generate the displacement command orders of the different cells and thus implement a method of automatic displacement of the cells 300.

The central controller 600 includes a processing or computing unit, such as a processor, and one or more memories comprising code data generating operating orders configured to implement a method of displacement of a cell 300 through the system 1 when they are implemented by a processing unit.

A command element 500 can include a processing or computing unit such as a processor, as well as one or more pre-actuators able to distribute energy to the actuators 400 as a function of the commands received from the central controller 600.

The central controller 600 and the command elements 500 form an electronic and computer network, in such a way as to communicate the commands to each of the modules 200 or cells 300 from the central controller 600.

Advantageously, the command elements 500 are secured to modules 200 which may be interconnected together in their mechanical, electrical and electronic operations.

The mechanical interconnection of the modules 200 makes it possible to fix a module 200 to its adjacent modules 200.

The electrical interconnection of the modules 200 makes it possible to propagate electrical power and thus supply the different electromechanical systems such as the actuators 400 and the command elements 500. This makes it possible to power the entire system by means of a limited number of power sources, and particularly to limit the need for integrated power-storing means, which would be heavy and bulky.

In a preferred embodiment each module 200 has its own command element 500 which is interconnected with the command elements 500 of the adjacent modules 200 via a wired electronic link 501, forming a global network within the system 1 for exchanging and transmitting the commands to any module 200 of the system 1.

This makes it possible to limit electromagnetic interference, and to limit the wiring of the system 1.

The modules 200 are advantageously identical in their function and in their structure, in such a way as to limit the production cost of the cell by effect of scale and to facilitate the maintenance of the system 1, each cell 200 being interchangeable.

The Module 200

Figure 4:
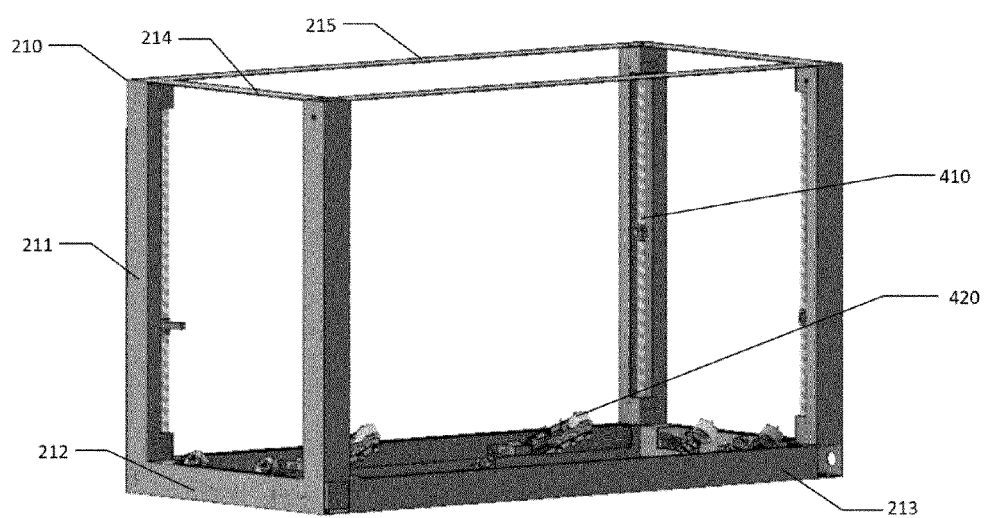
FIG. 4 is a view of an embodiment of a module according to the invention.

In the embodiment represented in FIG. 4, a module 200 includes a frame 210, and the frame 210 includes a plurality of bars forming a rectangular parallelepiped.

In the embodiment represented, the frame 210 includes:
Four uprights 211 extending along a vertical direction, the vertical direction being relative to the disposition of the system under normal operating conditions,
Two first bars 212 extending parallel along a longitudinal direction, each first bar 212 extending from an upright to a second upright,
Two second bars 213 extending parallel along a transverse direction, each second bar 213 extending from an upright to a second upright,
Two third bars 214 extending parallel along the longitudinal direction, each third bar 214 extending from an upright to a second upright, the third bars 214 extending parallel to the first bars 212,
Two fourth bars 215 extending parallel along the transverse direction, each fourth bar 215 extending from one upright to a second upright, the fourth bars 215 extending parallel to the second bars 213.

Under normal operating conditions, the frame 210 is disposed in such a way that the first bars 212 and second bars 213 form the lower plane of the rectangular parallelepiped, and the third bars 214 and fourth bars 215 form the upper plane of the rectangular parallelepiped.

The terms "lower" and "upper" are defined along the vertical direction.

In the embodiment represented, a module 200 also includes vertical actuators 410, horizontal actuators 420, a command element 500, data connectors and power connectors, secured to the frame 210. This in particular makes it possible to avoid positioning the actuators 400 on the cells 300 and thus to limit the weight of the cells 300 and therefore the power consumption of the system 1. This also makes it possible to facilitate the supply of power to the actuators 400 and to limit the use of batteries and constraints related to batteries, particularly recharging.

The motors used to set the vertical 410 and horizontal 420 actuators in motion are connected to the command element 500.

The data connectors allow the command elements 500 of two adjacent modules to transmit information to one another. The power connectors are used to transmit electrical power from module 200 to module 200.

In an embodiment, each of the faces of a module includes a power connector and a data connector on at least one corner of the face. Two antagonistic faces of one and the same module 200 have power and data connectors located respectively one face opposite the other. That makes it possible to form a modular structure by connecting different adjacent modules 200 at least pairwise, whatever the adjacent faces of said modules, which facilitates the assembly.

Advantageously, the power and data connectors of the faces of the module 200 which are intended to be the lower face and the upper face are located in such a way that they cannot be connected to the connectors of the lateral faces of the module 200. This makes it possible to form a failsafe and ensure the assembly of the modules 200 along a correct orientation in the system 1.

A module 200 may be equipped with a detection device configured to detect the presence or absence of a cell 300 within said module 200. It may for example comprise an optical sensor, or an inductive proximity sensor, or any other sensor able to detect the presence of a cell 300 in the module 200.

A module 200 may be equipped with a detection device configured to detect the speed of a cell 300 within said module 200. It may for example comprise an optical sensor, or a device for measuring speed by Doppler effect, or any sensor able to detect the speed of a cell 300 in the module 200.

The central controller 600 is able to detect the connection, the position and the orientation of a new module 200 in the system 1 and is configured to virtually model the modules 200 forming the system 1. The central controller 600 thus updates the virtual model of the system 1 gradually as new modules 200 are connected. The central controller 600 is thus able at any time to know the state of the system 1, its geometry and the distribution of the full and empty modules 200 in the system.

The Cell 300

Figure 5:
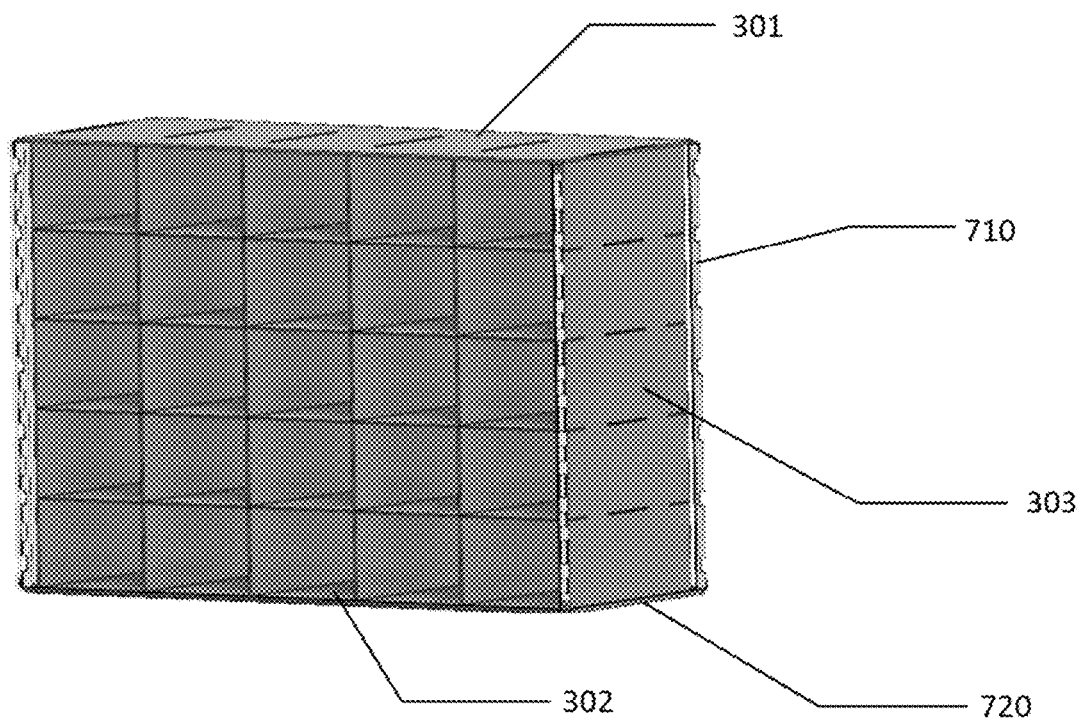
FIG. 5 is a view of an embodiment of a cell according to the invention.

In the embodiment represented in FIG. 5, the cell 300 includes an upper plate 301, a lower plate 302, and two parallel lateral plates 303 extending from the lower plate 302 to the upper plate 301, preferably along the vertical direction.

The plates 301, 302, 303 of the cell 300 together define an enclosure able to receive content (an item of stock). In the embodiment represented, the enclosure has two open lateral faces, which improves accessibility for a user.

In a non-represented variant, the cell 300 can include an additional lateral plate forming a bottom, or in another variant additional lateral plates intended to form a closed, and optionally hermetically sealed enclosure. Optionally, the cells may include a drainage system, for example a tap, used to at least partly evacuate the contents of the cell.

In an embodiment, the walls may have a thermal insulation structure, and/or an electrical and/or magnetic insulation structure, or else shielding.

In an embodiment, the cell 300 may include an electrical power supply and/or sensors, for example position sensors, configured to communicate with a command element 500 or the central controller 600.

In order to allow the displacement of the cell 300 from one module 200 to another, the modules 200 and cells 300 include actuators 500 and complementary indentations 700 attached, one to the uprights 211 and bars 212, 213, 214, 215 of the frame 210, and the others to the cells 300.

In the embodiment represented, the two different types of indentation are identified:

The vertical indentations 710, allowing the displacement of a cell 300 along the vertical direction, The horizontal indentations 720, allowing the displacement of a cell 300 along the longitudinal and transverse directions.

Optionally, the cells 300 include an identification element configured to be detected by the command element 500 of a module 200. In this way, the position of each cell 300 in the system 1 is known at all times. The identification element may be optical, for example a bar code, which is read by an optical sensor supplied on the command element 500 of the module 200. This makes it possible to limit the use of additional material, and to limit the emission of electromagnetic signals.

Alternatively, the central controller 600 keeps in its memory all the movements made by each of the cells 300, which is associated with an identifier set arbitrarily by the user at the time of initialization of the system 1, in such a way as to know the position of each of the cells 300 in the system 1.

The Actuator 400

The actuators 400 and indentations 700 are configured to cooperate in such a way as to translationally drive a cell 300 located at least partially in a module 200 toward an adjacent module 200.

In a preferred embodiment, the actuators 400 include:
Vertical actuators 410 configured to vertically displace the cell 300,
Horizontal actuators 420 configured to displace the cell 300 along the longitudinal and transverse directions.

The Vertical Actuator 410

Figure 6:
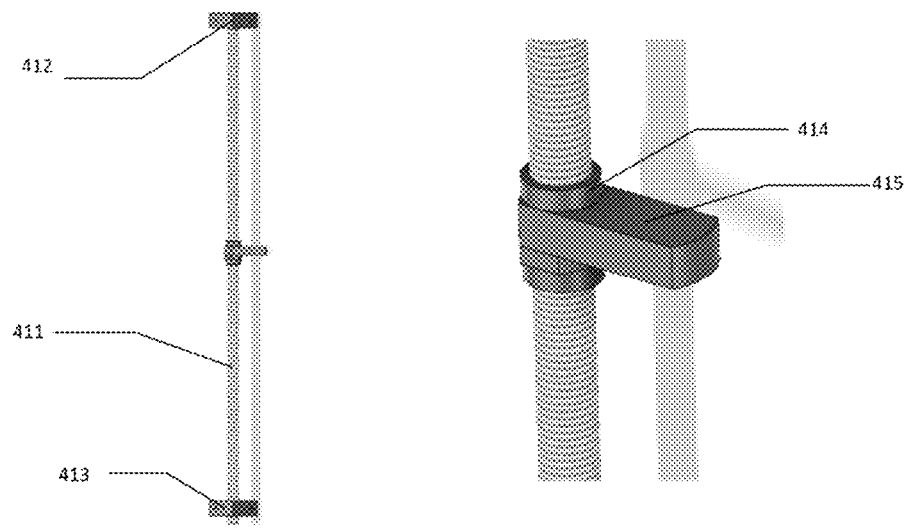
FIG. 6 is a front and perspective view of an embodiment of a vertical actuator of a module according to the invention.

In the embodiment represented in FIG. 6, the vertical actuator 410 includes a worm screw 411, rotatably mounted on the frame 210 by means of an upper screw holder 412 and a lower screw holder 413 and driven by an electrical motor.

Such a type of actuator has a reduced bulk while having considerable robustness and precision. Precision is in particular obtained by the reduction effect resulting from the pitch of the screw 411 and of the resolution of the motor. Furthermore, the robustness of this type of actuator makes it possible to limit the need for a motor brake to obtain a stable static position despite gravity.

In the embodiment represented, the upper 412 and lower 413 screw holders are attached to the upright 211 of the frame 210.

On the screw 411 is found a nut 414, suitable for the screw 411. The nut 414 includes a protrusion 415.

Figure 7A:
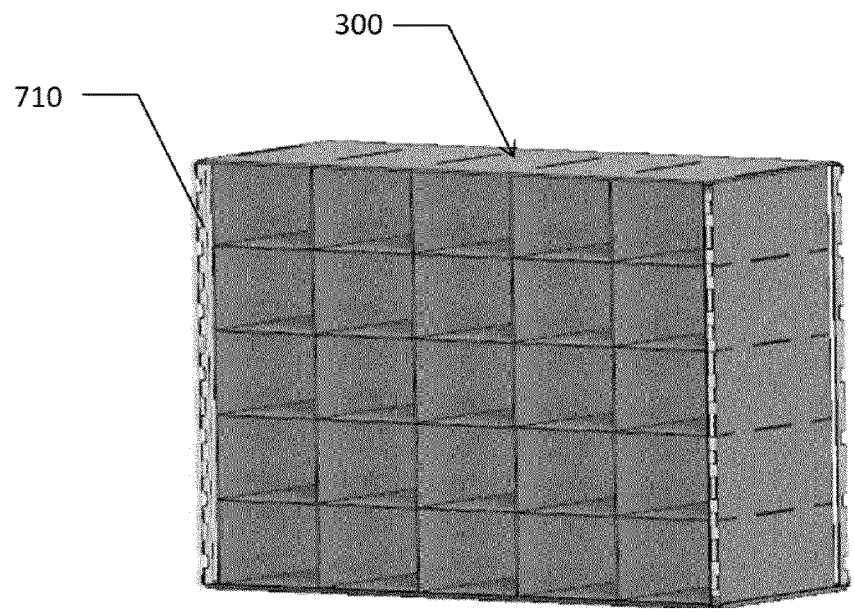
FIGS. 7a and 7b are perspective views of an embodiment of a vertical indentation of a cell according to the invention.
Figure 7B:
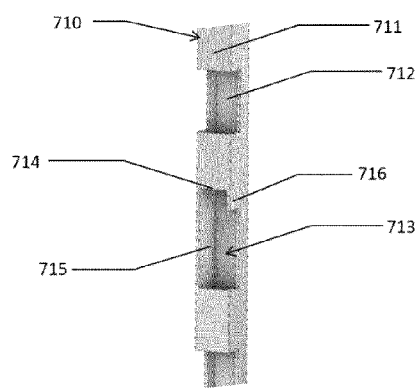

With reference to FIGS. 7a and 7b, the vertical indentation 710 is made on a protrusion located along a vertical edge of the cell 300.

The vertical indentation 710 includes a succession of crenellations 711 defining hollows 712 between them. On each crenellation a blind recess 713 is made.

The blind recess 713 includes a support face 714 delineating at the top the blind recess 713. The support face 714 is configured to form a bearing surface for the protrusion 415 of the vertical actuator 410.

The blind recess 713 further includes an obstacle surface 715 configured to form an obstacle to the protrusion 415 of the vertical actuator 410 and thus prevent its rotation.

In this way, when the screw 411 is rotated, rotating the protrusion 415 by friction, the protrusion 415 comes into contact with the obstacle surface 715 which limits the rotation of the protrusion 415, and therefore of the nut 414, which translates the nut 414, and therefore the protrusion 415 with respect to the screw 411.

The protrusion 415 then comes into contact with the support face 714, which has the effect of translating the cell 300.

This position of the protrusion 415 is defined as the clutched position.

Optionally but advantageously, the blind recess 713 further includes a blocking rim 716, formed by a portion of surface extending opposite the obstacle surface 715 from the support face 714. The blocking rim 716 is configured to avoid the protrusion 415 becoming dislodged from the blind recess 713 in the event of loss of friction between the protrusion 415 and the support face 714.

This scenario may be encountered for example during a downward translational movement.

During the operation of the vertical actuator 410, when the protrusion 415 comes into contact with the upright 211 of the frame 210, it is locked in its rotational movement, and is displaced in vertical translation by way of the helical coupling between the nut 414 and the screw 411. The vertical translation may be upward or downward along the sense of rotation of the screw 411.

The "upward sense" of the screw 411 is defined as the sense of rotation driving the nut 514 rotationally locked in upward vertical translation. Similarly, the "downward sense" of the screw 411 is defined as the sense of rotation driving the nut 514 rotationally locked in downward vertical translation.

Similarly, when the protrusion 415 comes into contact with a crenellation 711, it is locked in its rotational movement, and is displaced in vertical translation.

If the protrusion 415, being displaced in vertical translation along the crenellation 711, arrives at the level of a blind recess 713 and the screw 411 turns in the upward sense, the protrusion 415 ceases its vertical translational movement since it is no longer rotationally locked, and resumes a rotational movement.

The protrusion 415 then comes back into contact with the obstacle surface 715, and thus translates the cell 300 as previously described.

When the protrusion 415, being displaced in vertical translation along the crenellation 711, arrives at the level of a hollow 712, the protrusion 415 resumes a rotational movement and then traverses the hollow 712.

The Horizontal Actuator 420

The horizontal actuator 420 includes one or more horizontal translators 421.

Figure 8:
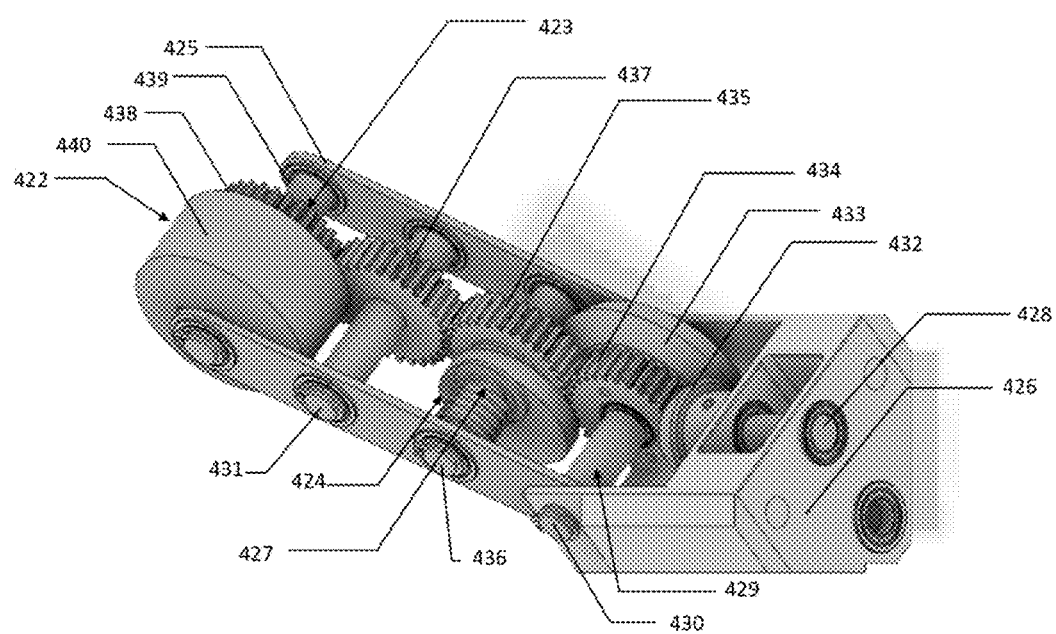
FIG. 8 is a perspective view of an embodiment of a horizontal translator of a module according to the invention.

With reference to FIG. 8, each horizontal translator 421 includes:
a driving element 422 configured to cooperate with the horizontal indentation 720 of the cell 300 in such a way as to translate the cell 300;
a driving actuator 423 configured to rotate the driving element 422;

a clutching device 424 configured to, selectively, put the driving element 422 and the cell 300 in engagement or disengage the driving element 422 from the cell 300.

The clutching device 424, by making it possible to retract the driving element 422, thus makes it possible to clear the space and to allow the circulation of the cell 300 in a different direction from the driving direction of the retracted driving element 422. This in particular makes it possible to drive a cell 300 along all three directions within one and the same module 200. Specifically, if a contact between the driving element 422 and the cell 300 is necessary for the driving of the cell 300 in a first direction, this contact opposes the circulation of the cell 300 in another direction. The possibility of retracting the driving element 422 removes this obstacle and therefore allows the potential displacement of the cell 300 in three directions within one and the same module 200.

In the embodiment represented, the clutching device 424 includes a movable arm 425 rotatably mounted on a translator frame 426 mounted fixed on the frame 210, the driving element 422 being rotatably mounted at one end of the movable arm 425, and a clutching actuator 427 configured to rotationally drive the movable arm 425. The driving element 422 and the driving actuator 423 are also mounted on the movable arm 425.

This makes it possible to limit the bulk of the horizontal translator 421.

In an embodiment, the horizontal translator 421 includes an input shaft 428 rotatably mounted in the translator frame 426, and a distribution assembly 429 driven by the input shaft 428, the distribution assembly 429 being configured to rotationally drive the clutching actuator 427 and the driving actuator 423 at once. This makes it possible to drastically limit the weight of the device, and the number of motors necessary for the horizontal translator 421.

In the embodiment represented, the distribution assembly 429 includes:
- a first intermediate shaft 430 rotatably mounted on the translator frame 426 along an axis perpendicular to the axis of the input shaft 428, the first intermediate shaft 430 being rotated by the input shaft 428 by means of a first bevel pinion 432 and a second bevel pinion 433 mounted respectively on the input shaft 428 and the first intermediate shaft 430;
- a first pinion 434, secured to the second bevel pinion 433, mounted on the first intermediate shaft 430;
- a second pinion 435 rotatably mounted on a support shaft 436 mounted on the movable arm 425, the second pinion being rotated by interaction with the first pinion 434, the second pinion being configured to drive the clutching actuator 427;
- a second intermediate shaft 431 rotatably mounted on the movable arm 425 and including a third pinion 437 cooperating with the second pinion 435 and the driving actuator 423, in such a way as to transmit the power of the input shaft 428 to the driving element 422, by way of the bevel pinions 432, 433, of the first pinion 434, of the second pinion 435 and of the third pinion 437.

In the embodiment represented, the driving actuator 423 includes a driving pinion 438 rotatably mounted on a shaft 439 mounted on the movable arm 425.

The driving element 422 includes a roller 440 secured to the driving pinion 438, the driving element 422 cooperating with the horizontal indentation 720 of the cell 300.

In an embodiment, the roller 440 is cylindrical and the horizontal indentation 720 is a plane inclined with respect to the horizontal. This thus makes it possible to simultaneously provide the guiding and the driving of the cell 300 when it is horizontally displaced. The angle of inclination of the horizontal indentation may be between 30° and 60°, preferably 45°.

In the embodiment represented, the horizontal indentations 720 are located on the lower edges of the cell 300. The horizontal indentations 720 may be a chamfer applied all along said edges, which may advantageously be covered by a band of material with a high frictional coefficient such as rubber.

Figure 9:
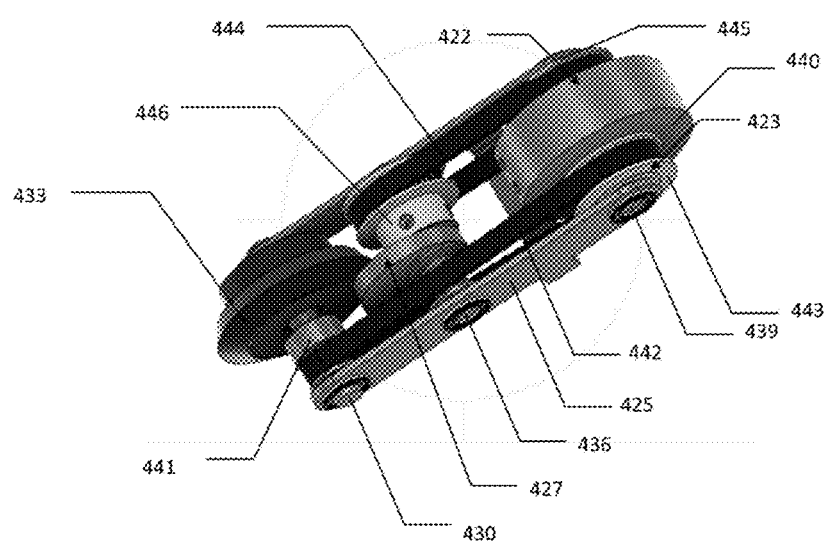
FIG. 9 is a perspective view of a second embodiment of a horizontal translator of a module according to the invention.

In another embodiment represented in FIG. 9, the distribution assembly 429 includes:
- a first pulley 441 mounted on a first intermediate shaft 430, the first intermediate shaft 430 being rotatably mounted on the translator frame 426 along an axis perpendicular to the axis of the input shaft 428, and being rotated by the input shaft 428 by means of a first bevel pinion 432 and a second bevel pinion 433 mounted respectively on the input shaft 428 and the first intermediate shaft 430;
- a second pulley 443 rotatably mounted on an axis 439 mounted on the movable arm 425, the second pulley 443 being configured to drive the driving element 422;
- a first belt 442 cooperating with the first pulley 441 and the second pulley 443;
- a third pulley 445 rotatably mounted on the shaft 439, the third pulley 445 being rotationally secured to the second pulley 443;
- a fourth pulley 446 rotatably mounted on a support shaft 436 mounted on the movable arm 425, the fourth pulley 446 being configured to drive the clutching actuator 427;
- a second belt 444 cooperating with the third pulley 445 and the fourth pulley 446.

The use of belts makes it possible to limit the number of parts of the device, as well as the manufacturing cost of the distribution assembly 429.

Figure 10A:
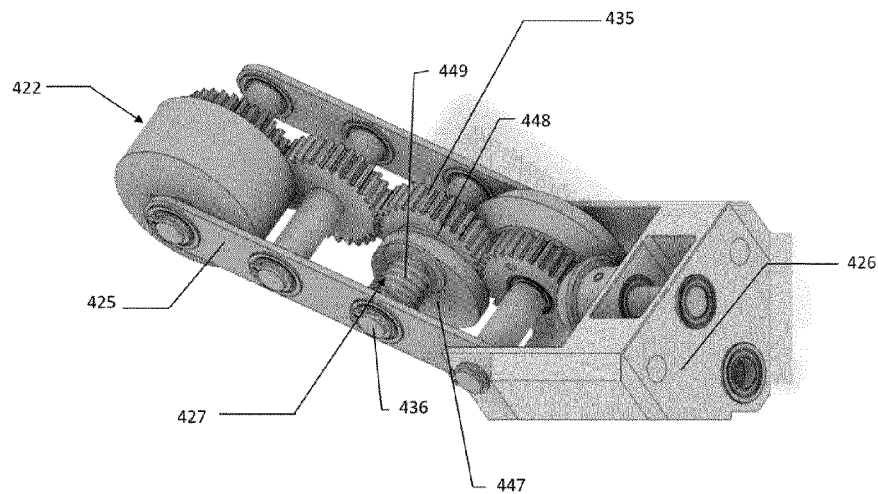
FIGS. 10a, 10b and 10c are perspective views of an embodiment of a clutching actuator of a horizontal translator of a module according to the invention; more particularly.
Figure 10B:
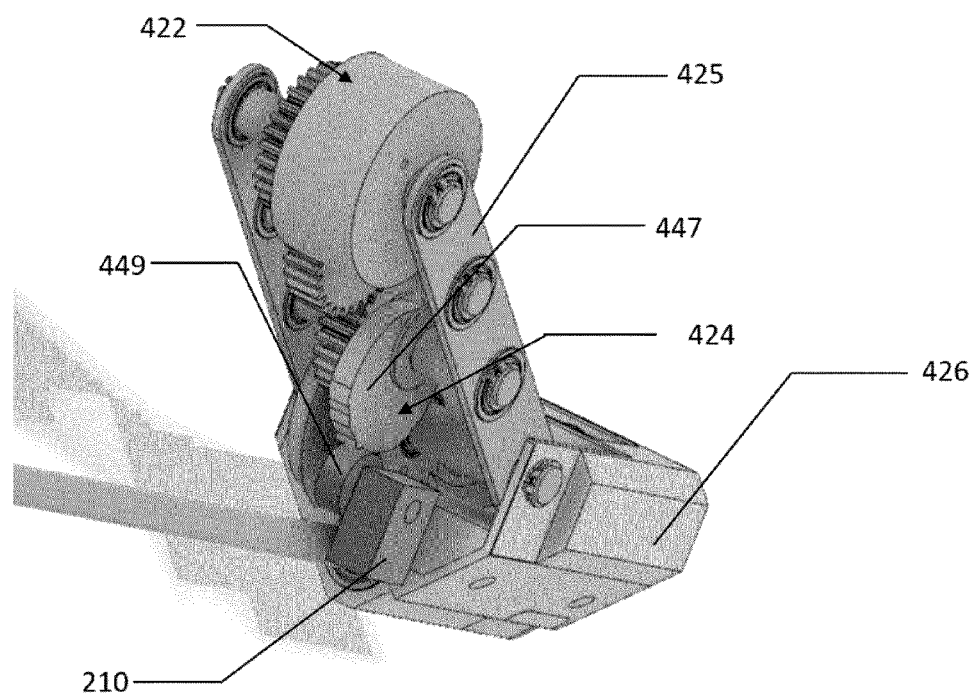
Figure 10C:
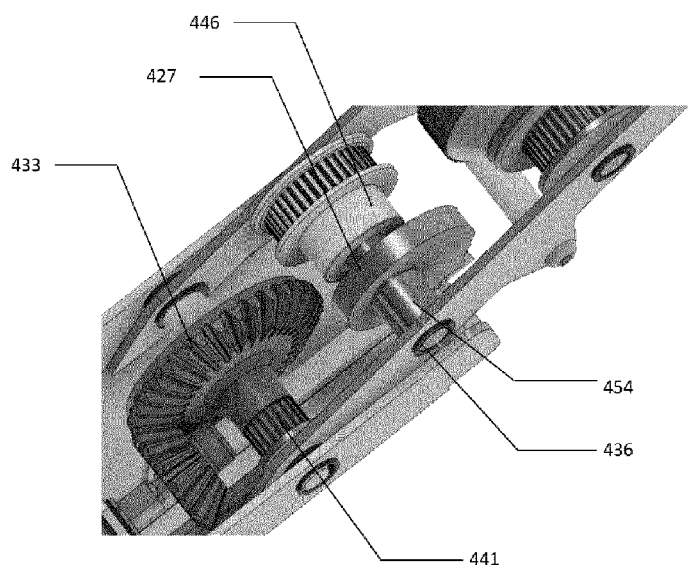

With reference to FIGS. 10a, 10b and 10c the clutching actuator 427 includes a cam 447 rotatably mounted on the support shaft 436. The cam 447 is rotated by a friction device 455. The friction device is configured to transmit a limited torque to the cam 447. Thus, if the cam 447 is rotationally locked by an obstacle, the distribution assembly 429 can continue to operate despite the immobilization of the cam 447.

In an embodiment illustrated in FIG. 10a, the friction device 455 includes a friction washer 448 inserted between the second pinion 435 and the cam 447. In the embodiment illustrated in FIG. 9, the friction washer 448 is located between the fourth pulley 446 and the cam 447. The friction washer 448 thus ensures the driving by friction of the cam 447 by transmitting the torque coming from the second pinion 435 or from the fourth pulley 446. A compression spring 449 mounted on the support shaft 436 and compressed between the movable arm 425 and the cam 447 makes it possible to provide the friction force needed for the driving of the cam 447.

In another embodiment illustrated in FIG. 10c, the friction device 455 includes a split ring 454 secured to the cam 447. The Cam 447 and split ring 454 assembly is rotatably mounted on the support shaft 436. In this embodiment, the support shaft 436 is rotated by the fourth pulley 446, or the second pinion 435. The split ring 454 provides a friction force on the support shaft 436, which makes it possible to transmit the torque of the support shaft 436 to the cam 447 and thus to rotate the cam 447 and split ring 454 assembly.

Such a structure makes it possible to limit the deformations of the friction device 455 and facilitate its assembly.

The cam 447 is configured to cooperate with a cam roller 449 rotatably mounted on the frame 210.

The cam 447 has a symmetrical profile with respect to a plane passing through the axis of rotation of the cam 447. This makes it possible to clutch the clutching device 424 whatever the sense of rotation of the input shaft 428.

Figure 11:
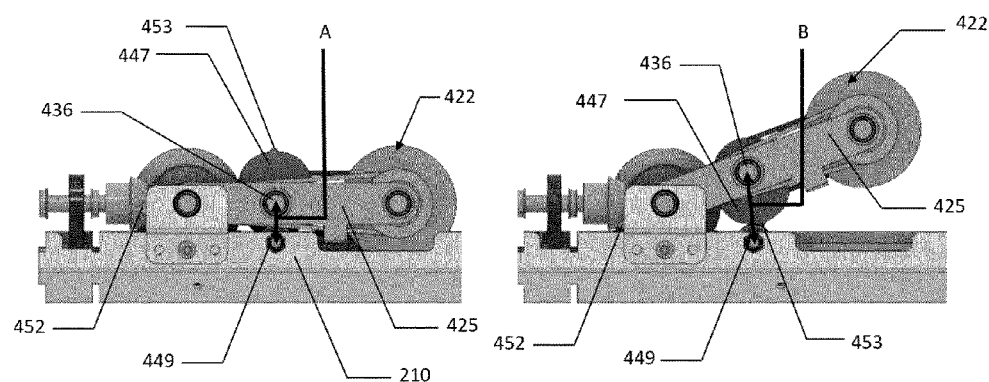
FIG. 11 is a view of an embodiment of the declutched and clutched position of a clutching actuator of a horizontal translator of a module according to the invention.

With reference to FIG. 11, the profile of the cam 447 is configured to present, in a first angular position, a first distance A between the support shaft 436 and the axis of rotation of the cam roller 449, and in a second angular position, a second distance B between the support shaft 436 and the axis of rotation of the cam roller 449.

The first distance A is configured in such a way that the clutching device 424 is in the declutched position, in which the driving element 423 is disengaged from the cell 300. In this way, the cell 300 does not interact with the driving element 422 whatever the displacement of said cell 300.

The second distance B is configured in such a way that the clutching device 424 is in the clutched position, in which the driving element 422 cooperates with the horizontal indentation 720 of the cell 300.

Advantageously, the clutching device 424 is configured in such a way that the driving element 422 extends in a plane inclined with respect to the vertical and to the horizontal, and toward the inside of the frame 210. In this way, the freeing up of the lateral faces of the frame 210 is improved. Furthermore, this makes it possible to drive the driving element 422 and to extend the clutching device 424 without using a bevel gear. This sharing makes it possible to reduce the number of parts and achieve better efficiency. The angle of inclination with respect to the horizontal is between 30° and 60°, and preferably 45°.

An opening on the first bars 402 and the second bars 403 is fashioned such that the horizontal translator 421 is at least partly housed in said bars when the clutching device 424 is in the declutched position. This makes it possible to improve the compactness of the device.

Optionally, the horizontal actuator 420 includes an angular stop 452 configured to limit the amplitude of the rotational movement of the movable arm 425 with respect to the frame 210.

The angular stop 452 may be positioned at one end of the movable arm 425, in such a way as to enter into contact with the frame 210 when the movable arm 425 reaches a certain angular position.

A stop tab 453 can be embodied on the cam 447 in such a way as to limit the rotation of the cam 447 when the stop tab 453 comes into contact with the cam roller 449.

Optionally, the stop tab 453 is positioned in such a way that the movable arm 425 is in the top position when the stop tab 453 comes into contact with the cam roller 449.

Advantageously, the stop tab 453 is configured in such a way that it makes it possible to obtain a stable top position of the movable arm 425 when the dog stop 453 is in contact with the cam roller 449.

Optionally, the horizontal actuator 420 includes an angular stop 452 and a stop tab 453, which improves the robustness of the horizontal actuator 420. The combined effect of the angular stop 452 and the stop tab 453 prevents the stop tab 453 from moving past the cam roller 449 by the mechanical limitation of the angular displacement of the movable arm 425, owing to the angular stop 452.

In a non-represented alternative, the angular stop 452 is embodied on the frame, and is configured to limit the movement of the movable arm 425 when the latter reaches a certain angular position.

Figure 12:
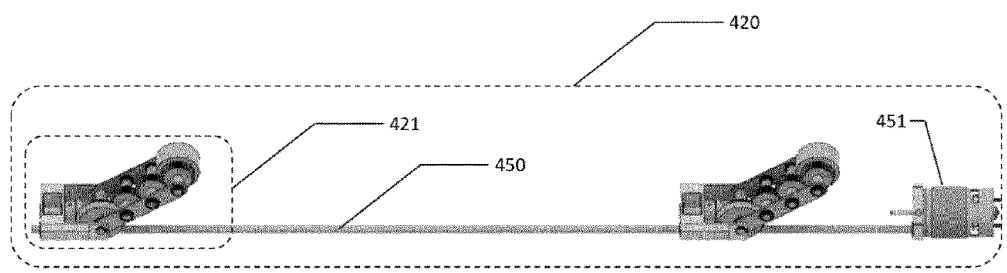
FIG. 12 is a view of an embodiment of a horizontal actuator according to the invention.

In a preferred embodiment, with reference to FIG. 12, a horizontal actuator 420 includes several horizontal translators 421, a transmission shaft 450 and an electrical motor 451 configured to drive the transmission shaft 450, the transmission shaft 450 being configured to simultaneously drive the horizontal translators 421.

This makes it possible to simultaneously drive all the horizontal translators 421 of a horizontal actuator 420 by means of a single motor, which makes it possible to promote synchronization and to limit the number of motors of a horizontal actuator 420, hence limiting the costs, the risk of malfunctions and the bulk of a horizontal actuator 420.

The horizontal translators 421 are positioned with respect to one another in such a way that the distance between two adjacent horizontal translators 421 of one and the same module 200 or of two adjacent modules 200 is less than half the length of the horizontal indentation 720. This makes it possible to avoid the tipping of a cell 300 when it is driven.

In a variant, the first bars 212 and second bars 213 are equipped with guide rollers (not represented) configured to support the cell 300 during its displacement between two adjacent modules 200, which makes it possible to limit the number of horizontal translators 421 needed to drive and guide the cell 300.

The driving of the transmission shaft 450 by the electrical motor 451 can be direct, or indirect, for example by means of a pulley and belt assembly, which makes it possible to maintain operation even in the event of vibrations or misalignments. Furthermore, this promotes the compactness of the horizontal actuator 420.

Operation of the Device

Figure 13A:
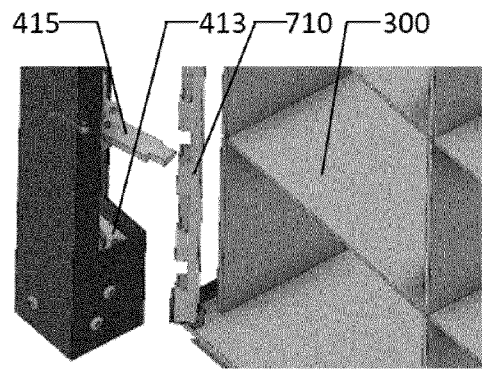
FIGS. 13a, 13b, 13c, 13d and 13e are views of an example of a displacement method for performing an upward vertical translation movement.
Figure 13B:
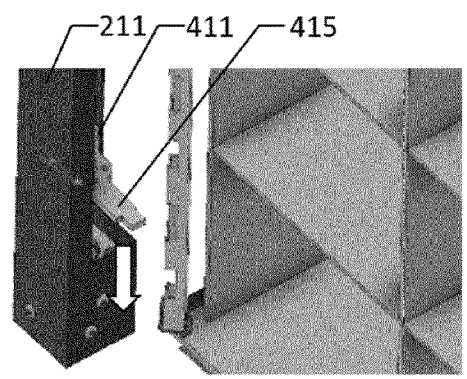
Figure 13C:
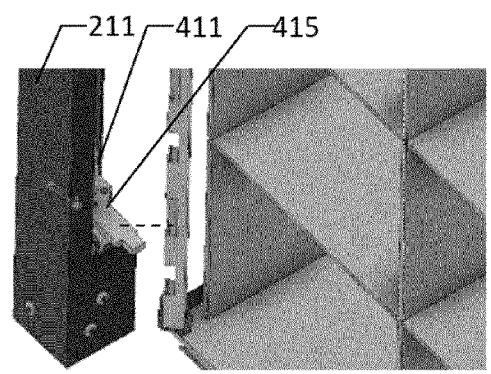
Figure 13D:
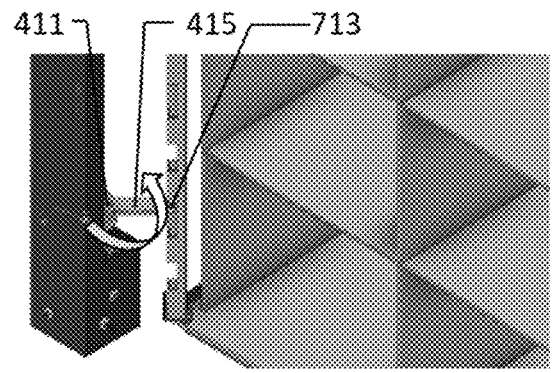
Figure 13E:
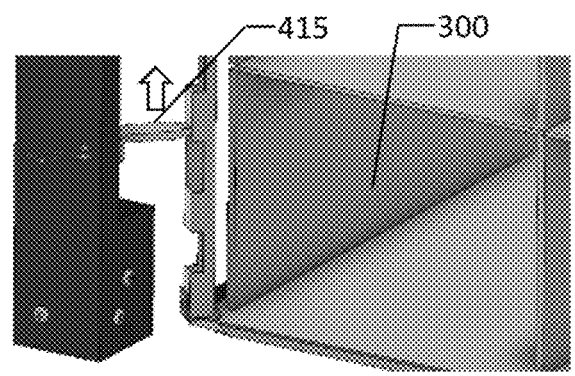

To perform an upward vertical translation movement of the cell 300, the displacement method can be as follows:
- with reference to FIG. 13a, the protrusion 415 is positioned at any height between the upper screw holder 412 (not represented on FIG. 13a) and the lower screw holder 413;
- with reference to FIG. 13b, the screw 411 is driven in the downward sense, until the protrusion 415 encounters the upright 211 of the frame 210; as described above, the protrusion 415 then descends along the upright 211;
- with reference to FIG. 13c, the protrusion 415 descends until it reaches a predefined bottom threshold;
- with reference to FIG. 13d, the screw 411 is then driven in the upward sense until the protrusion 415 enters the engaged position in the blind recess 713;
- with reference to FIG. 13e, the cell 300 is thus driven upward.

Figure 14A:
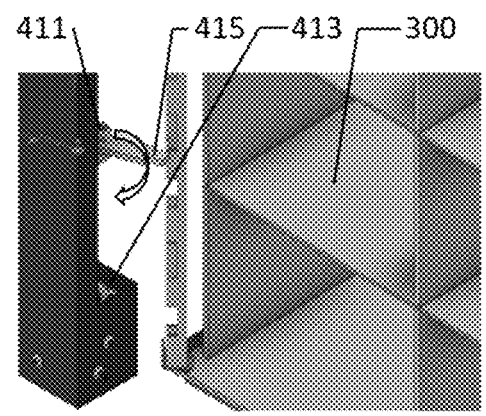
FIGS. 14a, 14b, 14c, 14d, 14e, 14f, 14g and 14h are views of an example of a displacement method for performing a downward vertical translation movement.
Figure 14B:
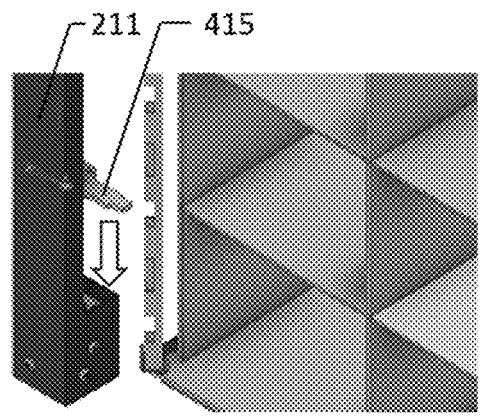
Figure 14C:
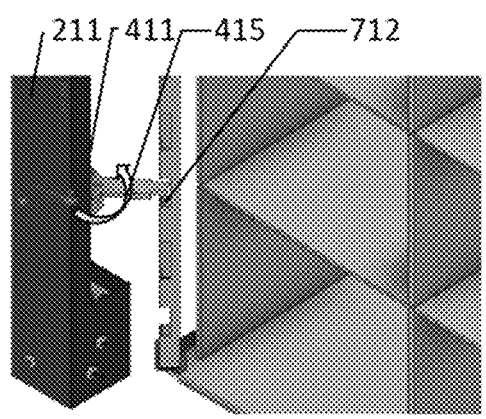
Figure 14D:
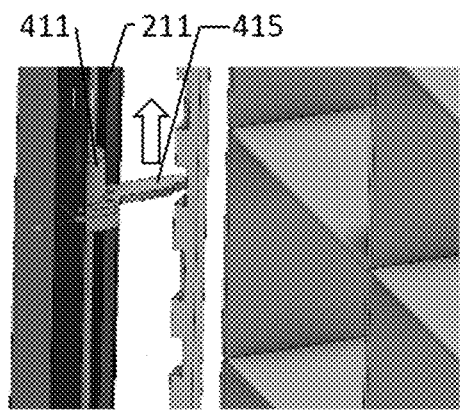
Figure 14E:
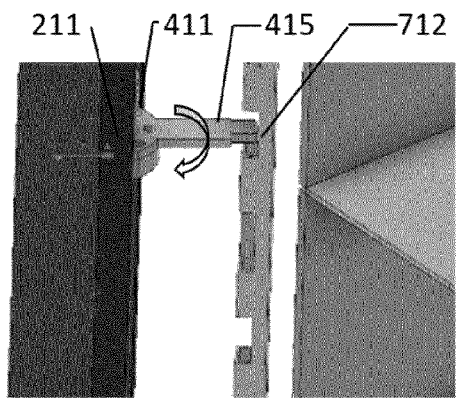
Figure 14F:
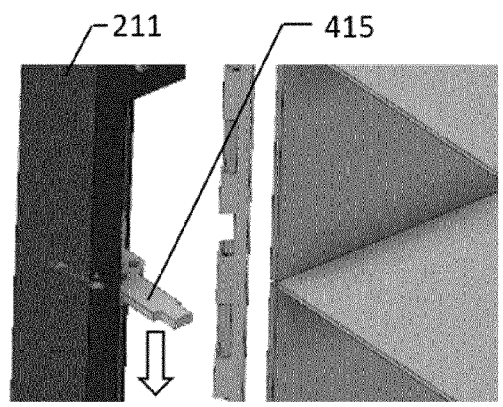
Figure 14G:
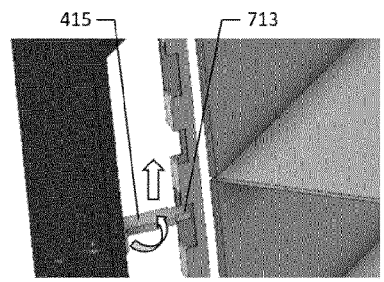
Figure 14H:
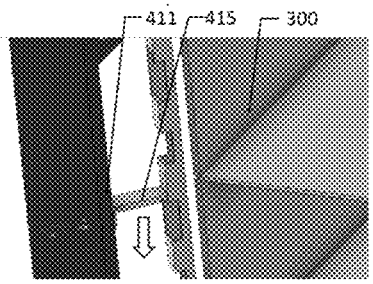
Figure 15:
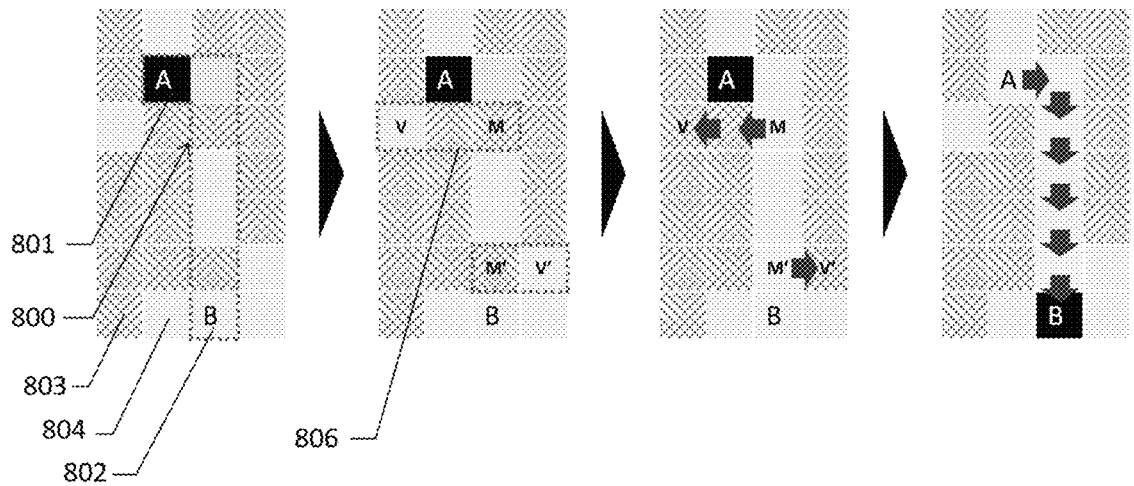
FIG. 15 illustrates the operating diagram of a path of displacement of a cell in the system according to the invention.

To produce a downward vertical translation movement of the cell 300, the displacement method can be as follows:
- with reference to FIG. 14a, the protrusion 415 is positioned at any height between the upper screw 412 (not represented in FIG. 14a) and the lower screw holder 413; the screw 411 is driven in the downward sense;
- with reference to FIG. 14b, as described above, the protrusion 415, once in contact with the upright 211, then descends along it;
- with reference to FIG. 14c, when the protrusion 415 reaches the level of the closest hollow 712 to the initial position, the screw 411 turns in the upward sense and traverses the hollow 712 until the protrusion 415 passes through the hollow 712 and reaches the upright 211 of the frame 210;

with reference to FIG. 14*d*, the screw 411 continues to turn in the upward sense and the protrusion 415 is rotationally locked against the upright 211, which causes the displacement of the protrusion 415 upward up to a pre-defined top threshold;

with reference to FIG. 14*e*, when the protrusion 415 reaches the level of the closest hollow 712 to the initial position, the screw 411 turns in the downward senses and passes through the hollow 712 until the protrusion 415 reaches the upright 211 of the frame 210;

with reference to FIG. 14*f*, the protrusion 415 once in contact with the upright 211 descends along it with reference to FIG. 14*g*, when the protrusion 415 reaches the highest blind recess 713, the screw 411 turns in the upward sense until the protrusion 415 enters the engaged position.

with reference to FIG. 14*h*, the screw 411 then turns in the downward sense, bringing the cell 300 down.

To make a movement of horizontal translation of the cell 300 in the direction of the transmission shaft 450 in one sense, that will arbitrarily be referred to as the front sense, the displacement method can be as follows:

The initial angular position of the cam 447 is the bottom position.

The transmission shaft 450 is rotated by the motor 451, which rotates each input shaft 428, then each second bevel pinion 433 by way of each first bevel pinion 432.

The second bevel pinion 433 rotates the first pinion 434, which rotates the second pinion 435, which rotates the third pinion 437, which rotates the driving pinion 438, which rotates the roller 440.

By friction with the friction washer 448, the cam 447 is rotated and leaves the bottom position. The cam 447 turns until it reaches one of the two top positions where the clutching device 424 is in the clutched position. The movable arm 425 then arrives at the top position against a stop 452 which prevents the cam 447 from turning further. The cam 447 remains locked in the top position and rubs against the friction washer 448 which continues to turn under the action of the second pinion 435.

In the top position, the roller 440 enters into contact with the horizontal indentation 720 of the cell 300. The roller 440, being in rotation, drives the cell by friction 300.

Once the movement has been finished, it is possible to retract the clutching device 424 of the horizontal translator 421.

By turning the motor 451 in the inverse sense to the previous one, a sense that will be arbitrarily referred to as the backward sense, the cam 447 is rotated by friction in the opposite sense to its previous ascent.

The cam 447 is no longer prevented from turning by the stop or stops, it therefore turns until it reaches the bottom position.

By stopping the motor 451, the clutching device 424 remains in the bottom position of the cam 447.

Method P1: Method of Displacement of a Target Cell (from a Module a to a Module B)

With reference to FIGS. 15*a*, 15*b*, 15*c*, 15*d*, different steps of a method of displacement of a target cell 300 are represented.

In the method represented, the vertical direction is relative to the disposition of the system under normal operating conditions of the system 1, the transverse and longitudinal directions of operation are the horizontal directions.

In the method represented, one or more target cells 300 are displaced via the modules 200 of a path 800 defined such that:

the path 800 is a suite of N modules 200, pairwise adjacent (module 1, module 2, . . . , module n−1, module n, module n+1, . . . , module N).

The term "length of the path" is given to the number N of modules forming it.

For a given module n of the path, the preceding module in the order of the path is called the preceding module n−1.

For a given module n of the path, the following module in the order of the path is called the following module n+1.

A module starting a path is called the initial module 801.

A module ending a path is called the final module 802.

Figure 16:
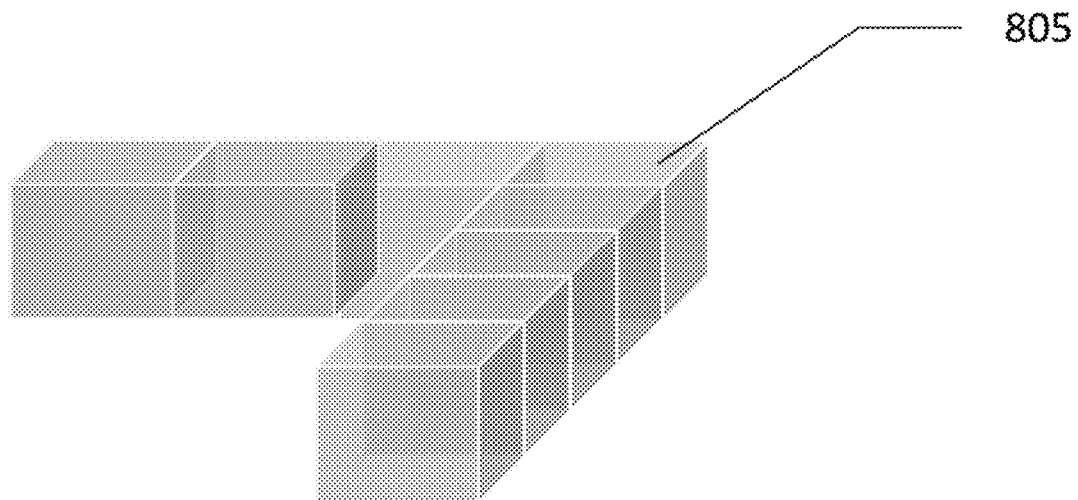
FIG. 16 illustrates in more detail a turn of a path of displacement according to the invention.

A path "A-B" is a path for which the initial module 801 is the module A and the final module 802 is the module B.

a module in "full state" 803 is a module that contains a cell at a given time a module in "empty state" 804 is a module that does not contain a cell at a given time a turn 805 of a path, as illustrated in FIG. 16, is a module n of said path such that the preceding module n−1, said module n and the following module n+1 are not aligned.

In the described method, the term "elementary displacement" is used to refer to a displacement of a cell from one module to one of its adjacent modules, and the term "command" an elementary displacement order generated by the central controller 600 addressed to the modules, and "sequence" a simultaneous set of commands addressed to several modules.

The term "target cell" is used to refer to the cell or cells that are to be conveyed from a module A to a module B, to differentiate them from the cells stored in the structure and which will be displaced to free up the path of the target cells.

Figure 17:
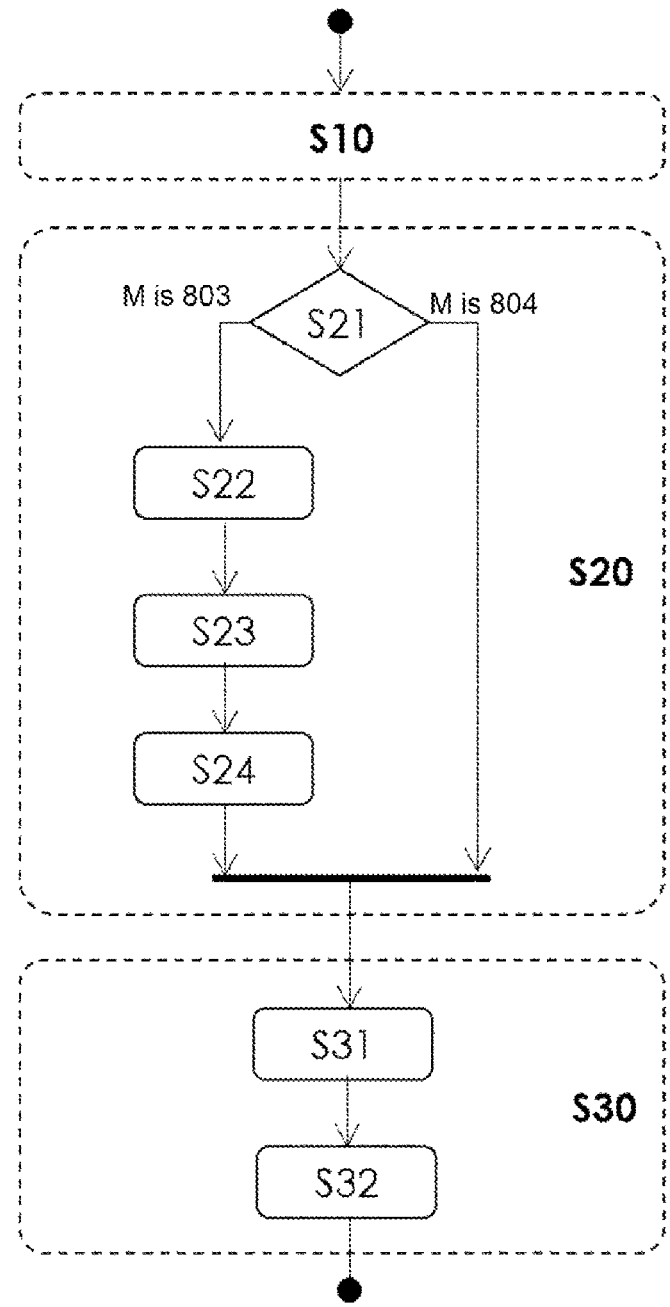
FIG. 17 illustrates the flow chart of the process P1 of displacement of a cell (from a module A to a module B)

The steps of the method of displacement of a cell P1 are represented in FIG. 17.

In a first macro-step S10, the central controller 600 implements a program configured to determine the most relevant path "A-B" between the module A and the module B. It performs this determination according to two non-restrictive criteria: the shortest path length (minimal N) and the minimum number of turns 805 in this path.

During step S10, the initial module 801 and the final module 802 are located in the grid formed by the modules 200 of the system 1.

A displacement vector composed of the elementary displacement components of the cell 300 is generated to evaluate the displacement the cell 300 should be made to undergo.

Different paths are then estimated and each comprise the components of the displacement vector.

Each of the paths is then evaluated as a function of the number of turns 805 contained in each respective path.

The path containing the fewest turns 805 is converted into sequences of elementary displacement orders addressed to the modules 200, in such a way as to bring the cell 300 from the initial module 801 to the final module 802.

Next, in a second macro-step S20, the path that was determined in the macro-step S10 is freed up, which is done in several steps described hereinafter.

In a step S21, the central controller 600 verifies for each module M belonging to the determined path "A-B" if it is in the "full state" 803 or in the "empty state" 804. If it is in the "empty state" 804, no action is required.

If it is in the "full state" 803, several actions are necessary to free up the path. In a step S22, the central controller 600 determines the module V which is in the "empty state" off the path "A-B" and for which the path "M-V" has the shortest length N. This path is called the escape path 806.

Next, in a step S23, the central controller generates a series of elementary displacement commands which is propagated to the different modules belonging to the escape path 806 (as described hereinafter in the order propagation method P3).

Finally, in a step S24, each module of the escape path 806 then displaces the cell to its following module according to the command received (as described hereinafter in the method of elementary displacement of a cell P2), in such a way as to make the initial module 801 change from a full state to an empty state, and the final module 802 from an empty state to its full state.

In a third macro-step S30, the target cell is moved forward from one end to the other of the path "A-B" which has been determined in macro-step S10 and freed up in macro-step S20. To do this, several steps are necessary and described hereinafter.

In a step S31, the central controller generates a series of elementary displacement commands which is propagated to the different modules of the Path "A-B".

Next in a step S32, each module of the path "A-B" then displaces the cell to its following module according to the command received, in such a way as to displace the cell from the module A to the module B. The method of displacement of the cell P1 is then finished.

Advantageously, macro-step S30 can be launched before the end of macro-step S20. Specifically, if the following module n+1 of the path is in the empty state, the target cell 300 can be displaced from the module n to the following module n+1. This makes it possible to accelerate the displacement of the target cell 300.

Concerning the method of displacement of the cell P1 overall, in the event of multiple displacements in parallel, several paths are advantageously constructed in parallel, in such a way as to increase the flow of the system 1.

Method P2: Method of Elementary Displacement of a Cell (from a Module a to One of its Adjacent Modules C)

In the method represented, the cell to be displaced is found at the beginning in a module denoted "module A".

Figure 18:
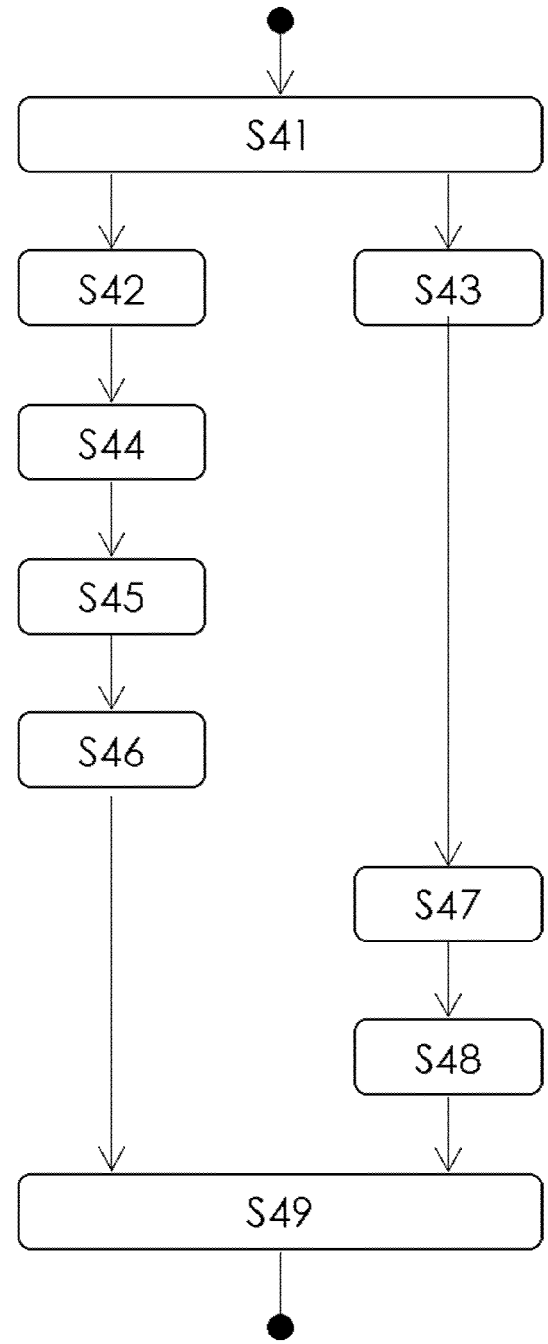
FIG. 18 illustrates the flow chart of the process P2 of displacement of a cell (from a module A to one of its adjacent modules C)

The steps of the method of elementary displacement of a cell P2 are hereinafter shown in detail, illustrated by a flow chart in FIG. 18.

In a first step S41, the central controller generates and propagates a message in the network of modules (as described hereinafter in the command propagation method P3), this message including the elementary displacement command of the cell present in the module A toward one of its adjacent modules C.

Two steps are then executed in parallel. In a step S42, the command element 500 of the module A receives the command to displace the cell to the adjacent module C, and in a step S43, the command element 500 of the module C receives the Command to receive the cell coming from the module A.

In a step S44 following step S42, the command element 500 of the module A drives the motors of said module.

In a step S45 the actuators 400 of the module A associated with the movement are extended, and the other actuators 400 of the module A which are already extended are simultaneously retracted. If the actuators 400 associated with the movement are already in the extended position, they are only set in motion. This makes it possible, in a step S46, to translate the cell in the direction of the module C.

In a step S47 following step S43, the command element 500 of the module C drives the motors of said module.

In a step S48 the actuators 400 of the module C associated with the movement are extended, and the other actuators 400 of the module C which are already extended are simultaneously retracted. If the actuators 400 associated with the movement are already in the extended position, they are only set in motion.

Following step S48, step S49, in the continuity of the translation begun in step S46, continues the translation of the cell from the module A to the module C until the cell is located inside the module C. The method of elementary displacement of a cell P2 is then ended.

Method P3: Command Propagation Method

Figure 19:
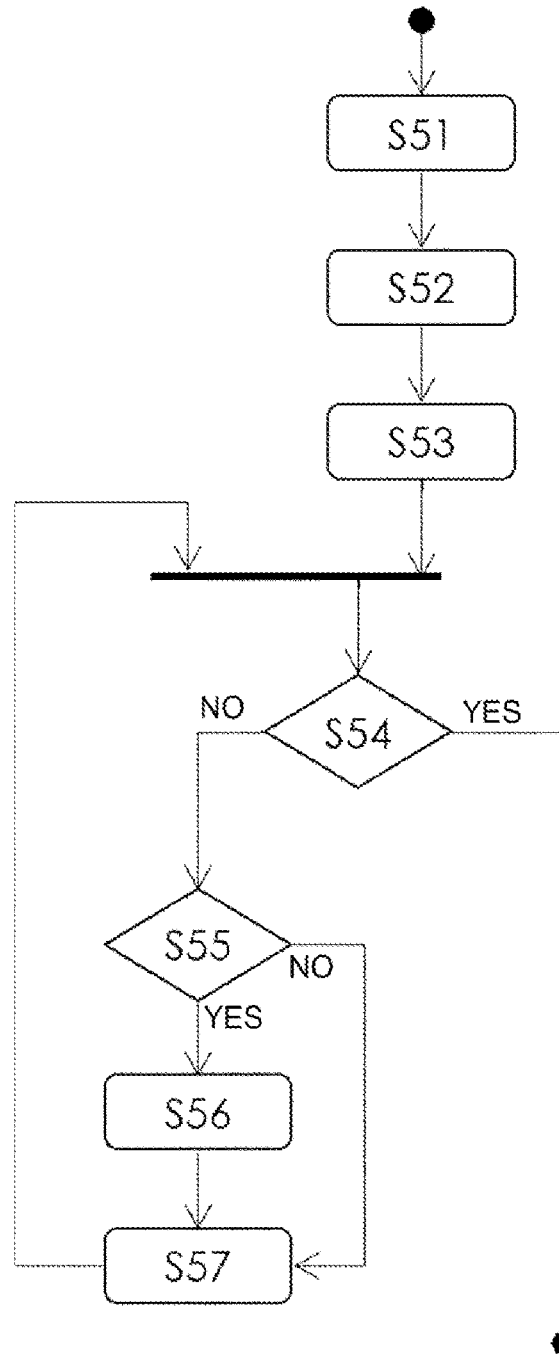
FIG. 19 illustrates the flow chart of the process P3 of command propagation.

The steps of the command propagation method P3 are hereinafter set out in detail, illustrated by a flow chart in FIG. 19.

In a first step S51, the central controller 600 generates a series of Sequences.

In a second step S52, the central controller 600 generates a "message" including a list of modules that must make an elementary displacement, as well as the data about the direction and sense in which to carry out these elementary displacements.

In a third step S53, the central controller 600 sends the message to the first module electronically connected to the central controller 600.

The receiver module, via its command element 500, checks in a step S54 whether or not it has already received the message. Otherwise it does nothing more. If it has not yet received the message, it checks in a step S55 if it is part of the list of modules contained in the message. If so, in a step S56, the order is taken into account by the receiver module. Otherwise the receiver module goes to step S56.

In a step S57, the command element 500 of the receiver module propagates the message to the modules adjacent to the receiver module. Each of these modules goes to step S54, and continues until all the modules have received the message, in which case the command propagation method P3 ends.

Such a method P3 is particularly advantageous in an architecture of network type, such as that of the system 1. This makes it possible to make the setpoints and data transit through the modules by nearest neighbor, which makes it possible to limit the wiring necessary to the operation of the system 1. It moreover simplifies the replacement of a module 200 when it has become damaged.

The invention claimed is:

1. A modular system for the displacement of storage items wherein said system includes a plurality of adjacent modules and at least one cell able to be displaced through the modular structure from a module to an adjacent module, a module including a frame of rectangular parallelepipedal shape including bars assembled together, at least one from among the modules and cells including at least one actuator and the other from among the modules and cells including complementary indentations, one from among the actuators and indentations being attached to the bars of the frame, the other from among the actuators and indentations being attached to the cell, the actuators and indentations being configured to cooperate in such a way as to translate a cell located at least partly in one module toward an adjacent module, the system further including a central controller, configured to drive the actuators and manage the displacement of the cell through the system, and wherein an actuator includes a driving element configured to engage with the indentations, and a clutching device configured to retract the driving element into a declutched position in which the driving element is at a distance from the indentations such that the driving element does not interact with the indentations.

2. The system as claimed in claim 1, wherein the actuators of a module are able to translate the cell along 3 dimensions.

3. The system as claimed in claim 1, wherein during its retraction, the driving element is displaced in a plane inclined with respect to the faces of the module, the inclination being between 30° and 60°.

4. The system as claimed in claim 1, wherein the actuator includes a vertical actuator including a worm screw rotatably mounted on the frame, a nut cooperating with the screw, the nut including a protrusion configured to cooperate with a vertical indentation made along a vertical edge of the cell, in such a way as to vertically translate the cell when the protrusion cooperates with the vertical indentation and the screw is rotated.

5. The system as claimed in claim 1, wherein the actuator includes a horizontal actuator including at least one horizontal translator including:
- a driving element configured to cooperate with a horizontal indentation made on the cell in such a way as to translate the cell;
- a driving actuator configured to rotate the driving element;
- a clutching device configured to, selectively, engage the driving element and the cell or disengage the driving element from the cell.

6. The system as claimed in claim 5, wherein the horizontal actuator includes several horizontal translators, a transmission shaft and an electrical motor configured to drive the transmission shaft, the transmission shaft being configured to simultaneously drive the horizontal translators.

7. The system as claimed in claim 5, wherein the clutching device includes:
- a movable arm rotatably mounted on a translator frame mounted fixed on the frame, the driving element being rotatably mounted at one end of the movable arm, and
- a clutching actuator configured to rotate the movable arm, the driving element and the driving actuator being also mounted on the movable arm.

8. The system as claimed in claim 7, wherein the horizontal translator further includes an input shaft rotatably mounted in a translator frame, and a distribution assembly driven by the input shaft, the distribution assembly being configured to rotationally drive the clutching actuator and the driving actuator at once.

9. The system as claimed in claim 8, wherein the clutching device includes a clutching actuator including:
- a cam rotatably mounted on the movable arm;
- a friction assembly configured to transmit a limited torque from the distribution assembly to the cam and thus ensure the rotating of the cam;
- a cam roller rotatably mounted on the frame configured to cooperate with the cam.

10. A module for a modular system for the displacement of storage items as claimed in claim 1, including a frame formed by a plurality of bars, and actuators configured to drive a cell in motion through the module.

11. A cell for a modular system for the displacement of storage items as claimed in claim 1, including indentations configured to cooperate with the actuators in such a way as to allow the displacement of the cell through the system.

12. A method of displacement of a target cell between an initial module and a final module for a modular system for the displacement of storage items as claimed in claim 1, comprising the steps of:
- S10: Determination of a path between the initial module and the final module, the path including N modules,
- S20: Displacement of the cells located on the previously determined path in such a way as to free up the path,
- S30: Displacement of the target cell toward the final module passing through the modules of the path, the step of displacement of the target cell being carried out each time the module of the path adjacent to the target cell is freed up.

13. A non-transitory computer readable medium storing instructions including code data configured, when implemented by a computing unit, to implement a method of displacement of a cell as claimed in claim 12.

* * * * *